(12) United States Patent
Parchamazad

(10) Patent No.: US 6,352,792 B1
(45) Date of Patent: Mar. 5, 2002

(54) PORTABLE CONGENERATION FUEL-CELL POWER GENERATOR FOR RECREATIONAL VEHICLES

(75) Inventor: Iraj Parchamazad, La Verne, CA (US)

(73) Assignee: Clean Fuel Generation, LLC, Los Angeles, CA (US)

( * ) Notice: Subject to any disclaimer, the term of this patent is extended or adjusted under 35 U.S.C. 154(b) by 0 days.

(21) Appl. No.: 09/531,137

(22) Filed: Mar. 17, 2000

(51) Int. Cl.[7] ................................................ H01M 8/02
(52) U.S. Cl. ........................................ 429/20; 422/196
(58) Field of Search .............................. 429/12, 13, 17, 429/22, 26, 40, 19, 20; 422/196, 177

(56) References Cited

U.S. PATENT DOCUMENTS 5,609,834 A * 3/1997 Hamada et al. ............. 422/196
5,861,137 A    1/1999 Edlund

* cited by examiner

Primary Examiner—Stephen Kalafut
Assistant Examiner—M. Wills
(74) Attorney, Agent, or Firm—A. M. Fernandez

(57) ABSTRACT

A steam reformer for producing $H_2$ from a low pressure hydrocarbon gas (preferably propane) is comprised of a short and narrow cylinder, loosely packed with pelletized catalyst, into which cylinder the low-pressure gas is drawn in by the high-pressure steam that flows from one end of the cylinder to the other, by making the extent that the gas tube protrudes into the cylinder substantially greater than the steam tube, such as by cutting the latter flush with the inside of the end cap. The cogenerated electricity and $H_2O$ vapor or liquid at elevated temperature are put into use through a switching converter and heat exchanger, respectively.

6 Claims, 1 Drawing Sheet

PORTABLE CONGENERATION FUEL-CELL POWER GENERATOR FOR RECREATIONAL VEHICLES

FIELD OF THE INVENTION

The invention relates to a hydrogen fuel-cell power generator, and more particularly to a steam reformer (catalytic converter) using propane (or other hydrocarbon gas) as a source of hydrogen for the fuel cell with only CO and $CO_2$ present that are easily removed before feeding the hydrogen to the fuel cell.

BACKGROUND OF THE INVENTION

Although there has been significant research and development of fuel cells for power generation, both stationary as well as portable for automotive power, there are other significant needs for a portable fuel-cell power generation, such as aboard recreational vehicles (RVs) for nonautomotive applications, e.g., lighting, cooking, refrigeration, television and air conditioning. Most RVs are presently equipped with a propane system for some of these purposes and equipped with an electrical generator driven by a gasoline engine for other uses, including air conditioning.

A major problem with a gasoline powered generator is not only air pollution in and around a parked RV but also the noise disturbance they cause to others, particularly when run while in an RV park during summer nights. In a marine RV, such as a houseboat on a lake, the lake water is used to cool the engine stored in a compartment below deck where exhaust of that engine is known to accumulate. Besides noise pollution above and below deck, the engine exhaust presents life threatening pollution to those who may be sleeping below deck. Such air and noise pollution is also a disturbance to other RVs parked nearby.

The problem then is to provide an electrical power generation system that is free of air and noise pollution, such as a hydrogen fuel-cell system, but that solution has its own problem for both land and marine RVs. That problem is not only the need for storing a reasonable supply of hydrogen aboard, but also the problem of refueling at filling stations or marine docks. If hydrogen is stored aboard, it must be at high pressure, and that presents a high risk because hydrogen is highly flammable and explosive. One could use metal hydrides as a source of stored hydrogen, such as iron or titanium hydride from which the hydrogen is released at specified temperatures, but hydrides are themselves flammable and thus present a fire risk, more so because they react violently with water. In any case, such hydrides would not be as readily available at filling stations and marine docks as propane or methane, and propane is already being routinely stored in RVs and readily available at filling stations and marine docks.

STATEMENT OF THE INVENTION

In accordance with the present invention, a hydrocarbon gas fuel reformer comprising a cylinder packed with a commercially available and pelletized catalyst is used to react with the low pressure hydrocarbon gas and steam at a higher pressure to produce an exhaust rich in hydrogen with only carbon monoxide and carbon dioxide which can be easily removed before feeding the hydrogen to a proton fuel cell.

The low pressure hydrocarbon gas is introduced into the cylinder by a tube protruding a significant length (about 5 cm) into the cylinder through an end cap while steam under higher pressure is introduced into the cylinder through a tube positioned in the cylinder end cap near the fuel tube, but cut off inside the cylinder a length significantly less than the hydrocarbon gas tube, and preferably flush with the inside face of the end cap.

The high velocity of the steam past the end of the hydrocarbon gas tube draws low pressure fuel out of that tube and mixes that fuel with the steam to pass over surfaces of the pelletized catalyst over the length of the cylinder to an exhaust through a tube at the end cap of the opposite end of the cylinder.

The nearly pure hydrogen gas flowing through the exhaust tube under pressure is stripped of carbon monoxide and dioxide by conventional means in order to feed virtually purified hydrogen to the proton (hydrogen) fuel cell which produces electricity and steam exhaust. To assure the requisite reaction temperature in the cylinder, means for heating the cylinder from the outside is provided, preferably an electric or gas oven closed around the cylinder.

Energy present in the steam or hot water exhaust is utilized aboard the RV to reduce the energy required to produce the steam, to heat space in the RV if desired and other uses, such as to heat water for cooking and other purposes. In that manner, cogeneration of electric and thermal energy is simultaneously produced for an indicated potential fuel savings, as much as 30% with this fuel reformer. The catalysis that takes place between the streams of input steam and fuel is a reaction in which heat and hydrogen is produced with traces of carbon monoxide and some carbon dioxide, but without consuming the catalyst. The catalyst itself may thus remain in use in the cylinder for hundreds of hours.

The exhaust steam from the fuel cell is condensed for use in a variety of ways aboard the RV, including potable water after purifying it through a carbon filter on the way to storage in a main water tank. The electricity generated can also be used for a variety of purposes after converting it to the requisite voltage for each purpose through a conventional switching converter.

The novel features that are considered characteristic of this invention are set forth with particularity in the appended claims. The invention will best be understood from the following description when read in connection with the accompanying drawings.

DETAILED DESCRIPTION OF THE PREFERRED EMBODIMENT

Figure 1:
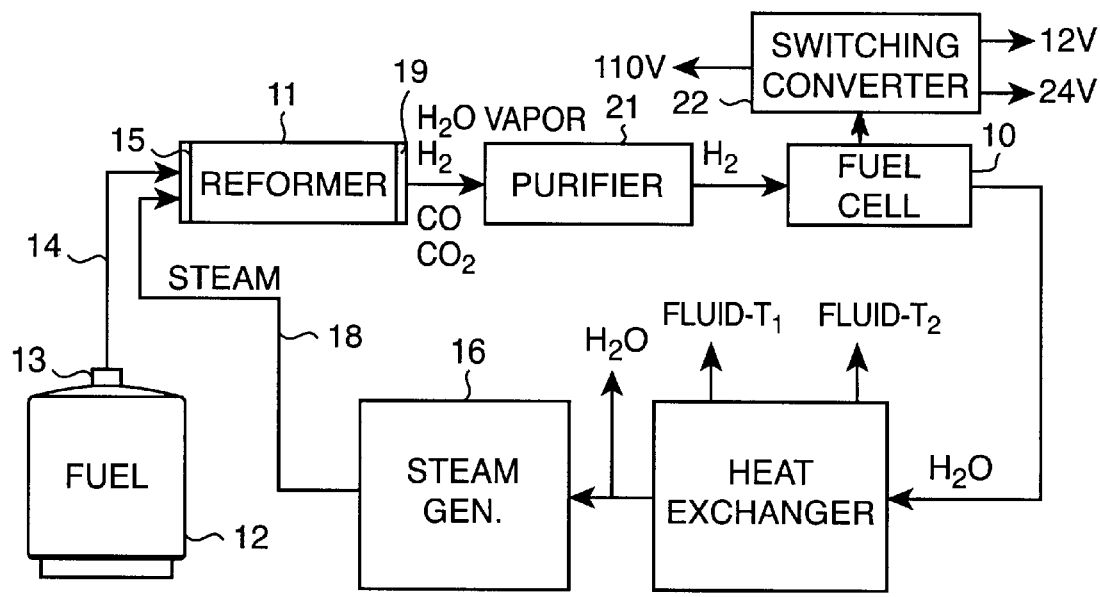
FIG. 1 illustrates a block diagram of a hydrogen fuel-cell system utilizing $H_2$ produced by a reformer from propane stored in a low pressure tank and steam, both of which are fed through an end cap by separate tubes at one end of a reformer cylinder to produce a hydrogen rich gas purified through a carbon filter in order to provide virtually pollutant-free generation of electricity and providing steam exhaust which, through a heat exchanger provides water at an elevated temperature. The heat exchanger heats a fluid (air or other fluid, such as water stored in a tank on the RV) and the condensed steam is purified (through a carbon filter, not shown) on the way to the storage tank aboard the RV.
Figure 2:
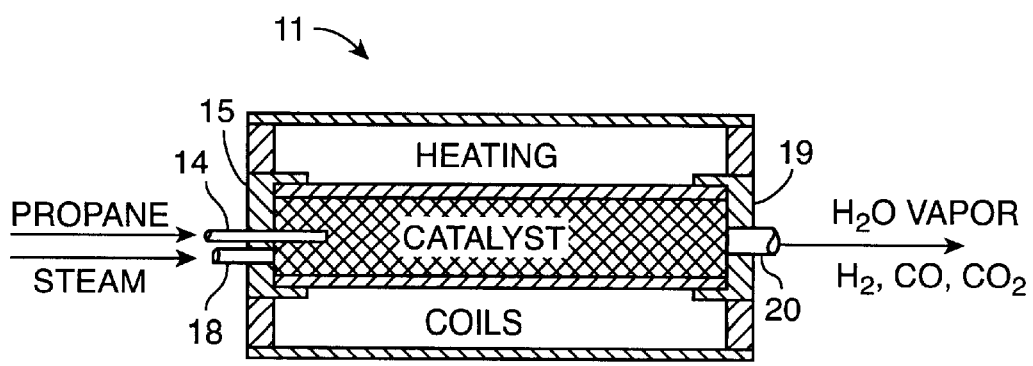
FIG. 2 is a schematic diagram of the reformer comprising a cylinder loosely packed with a pelletized catalyst and an enclosing furnace to bring the catalyst to an optimum temperature for the reaction of steam and propane, in the presence of pelletized catalyst in the reformer.

Referring to FIG. 1, a cogeneration power system useful aboard an RV utilizes a proton fuel cell 10 provided with purified $H_2$ from a reformer 11 that uses fuel from a low-pressure tank 12 filled with liquified propane. Once a valve 13 is opened, fuel vapor fills a small tube 14 (typically 1/8" diameter) protruding a significant extent through an end cap 15 into the reformer as shown in FIG. 2.

Steam under pressure (50 psi) from a steam generator 16 enters a 12"×3/4" stainless steel (Schedule 40) cylinder 17 loosely packed with a pelletized catalyst through a tube 18 of larger diameter (typically 1/4") than the tube 14 for the low pressure fuel that is at about 1/2 psi. The steam, entering the reactor cylinder under significant pressure greater than that of the fuel, flows over the tube 14 inside the cylinder and draws the low pressure fuel out of that small tube into the reactor cylinder which quickly mixes with the steam and comes into contact with the catalyst as the mixture flows through the cylinder.

A problem in using propane as a fuel for steam reforming has been providing adequate pressure for delivery of the propane gas into the reactor cylinder. To run the fuel-cell system, high pressure is needed for the steam and fuel. While the steam is easily generated with adequate pressure, the liquified propane fuel normally comes out of a storage tank at relatively low gas pressure. That then presents a problem of introducing the propane gas into the cylinder in competition with the steam at a higher pressure. That problem would generally be solved by increasing the fuel pressure with a compressor, but such a compressor is not available at the present time aboard an RV and would introduce a substantial risk. It would be safer to operate the system with low pressure propane gas and arrange for the inflow of steam to draw out the propane gas from the tube 14 by terminating the steam tube 18 at the inside face of the end cap 15 while extending the fuel tube 14 a significant extent into the cylinder. A threaded end cap 19 at the opposite end of the cylinder is provided with an exhaust tube 20 of a diameter sufficiently greater than the diameter of the steam tube 18 to prevent excess back pressure of the steam and reformed gas in the cylinder. The flow velocity of the mixture through the exhaust tube 20 is thus established by the fuel and steam pressure and temperature and reformer kinetics. The low back pressure that affords optimum residence time of the mixture in contact with the catalyst pellets is empirically determined from the combination of those factors.

Because the steam pressure is significantly higher than that of the propane fuel in the tube 14, a greater flow of steam is maintained over the end of the fuel tube which draws out the low pressure propane fuel and causes it to mix with the steam and be in contact with the loosely packed catalyst pellets as the flow of the mixture progresses to the exhaust tube 20. That exhaust is a hydrogen rich gas containing CO and $CO_2$ and some $H_2O$ vapor.

That exhaust vapor is passed through a purifier 21 (carbon filter) to strip the CO and $CO_2$ molecules from the hydrogen rich stream into the 1.5–8 kw fuel cell 10. The purified hydrogen stream fed into the fuel cell reacts with a catalyst on a center membrane which splits the hydrogen atoms into electrons and protons. Only the protons (hydrogen) pass through the membrane and combine on the other side with oxygen to produce $H_2O$ exhaust. The electrons travel around the membrane and are collected to provide a current to a switching converter 22. The proton fuel cell thus serves as a 100V, 5 amp source which may be converted to a lower voltage such as 12V or 24V, either DC or AC. To provide this power and to increase it if desired, the practice is to stack fuel cells, so although the term "fuel cell" has been used throughout in the singular, it is to be understood that the term applies to a plurality in a stack acting in unison as one cell.

The exhaust water from the fuel cell 10 is at an elevated temperature and therefore contains energy. That energy is recovered in a heat exchanger 23. For example, a useful type of heat exchanger is a shell and tube where hot water flows through a coiled tube in a shell while a fluid, such as the space air in an RV, is forced through the shell to be heated as the water is cooled. Thus, by utilizing the released heat from the electrical power generating system, the total efficiency will be very high (80%). In the case of the reformer 11, the loosely packed pelletized catalyst (United Catalyst's G-91) must be heated for efficient catalysis to take place, adding to the heat of reaction in the reformer that goes into the fuel cell and ultimately out in the exhaust.

The pelletized catalyst may be in any standard size and shape of pellets, but not so small as to pack too tightly and cause such undesired high back pressure as to reduce the flow through the cylinder below the optimum. A pressure relief valve could be inserted in the input steam tube 18 to avoid any unsafe back pressure in the reformer, but it is preferable to empirically select the form (shape and size) of the pellets that will provide the optimum flow rate (residence time) and surface contact with the propane and steam mixture for the reaction of the propane and steam desired in combination with the size of the cylinder.

Although particular embodiments of the invention have been described an illustrated herein with reference to propane, it is recognized that methane may be alternatively used and that other modifications may readily occur to those skilled in the art. Consequently, it is intended that the claims be interpreted to cover such modifications and equivalents thereof.

What is claimed is:

1. A hydrocarbon gas and steam reformer for fueling a proton fuel cell with $H_2$ from a low pressure hydrocarbon gas tank, comprising
   a cylinder loosely packed with a pelletized catalyst,
   a tube for introducing said hydrocarbon gas into said cylinder at low pressure through a cap at one end thereof, said tube having a length protruding into said cylinder,
   an exhaust tube protruding outwardly from said cylinder through an end cap at an end of said cylinder opposite said one end, and
   a tube for introducing steam into said cylinder at said one end at a pressure higher than said low pressure hydrocarbon gas, said steam tube having a lesser length than said hydrocarbon gas tube or virtually no length protruding into said cylinder,
   wherein said steam tube is positioned adjacent said hydrocarbon gas tube, whereby said steam of higher pressure produces a flow stream of steam over an open end of said hydrocarbon gas tube to draw out and mix said hydrocarbon gas with said steam,
   whereby said hydrocarbon gas mixed with said steam is in contact with said loosely packed pelletized catalyst under pressure and elevated temperature as it flows through said cylinder for said hydrocarbon gas to be converted into a stream of $H_2$, CO and $CO_2$.

2. A hydrocarbon gas and steam reformer for fueling a proton fuel cell as defined in claim 1 including purifying means for removing said CO and $CO_2$ from said stream of $H_2$, thereby fueling said proton fuel cell with virtually pure $H_2$, whereby protons of hydrogen pass through a membrane of said fuel cell, while electrons thereof that do not pass form electricity, and said protons that pass through said membrane combine with electrons to form hydrogen atoms that combine with atmospheric oxygen to produce H₂O vapor or hot water at an elevated temperature.

3. A hydrocarbon gas and steam reformer for fueling a proton fuel cell as defined in claim 2 including heat exchange means for transferring heat from said H₂O vapor to another useful fluid, thereby cogenerating thermal energy in said useful fluid while said fuel cell is generating said electricity.

4. A hydrocarbon gas and steam reformer for fueling a proton fuel cell as defined in claim 2 for generating electricity including a switching converter connected to said fuel cell for converting said electricity generated into one or more useful voltage levels.

5. A hydrocarbon gas and steam reformer for fueling a proton fuel cell as defined in claim 1 including a heat source around said cylinder for heating said catalyst.

6. A hydrocarbon gas and steam reformer for fueling a proton fuel cell as defined in claim 1 wherein said hydrocarbon gas is low pressure propane, which is storable as liquified propane in a container for safe use aboard recreational vehicles.

* * * * *